(12) United States Patent
Chan et al.

(10) Patent No.: US 7,787,450 B1
(45) Date of Patent: Aug. 31, 2010

(54) METHOD AND SYSTEM FOR EFFICIENT NETWORK FORMATION AND MAINTENANCE OF NODE ROUTING DATABASES IN A MOBILE AD-HOC NETWORK

(75) Inventors: Chi Chiu Chan, Wayne, NJ (US); Amit Patel, Edison, NJ (US)

(73) Assignee: ITT Manufacturing Enterprises, Inc, Wilmington, DE (US)

( * ) Notice: Subject to any disclaimer, the term of this patent is extended or adjusted under 35 U.S.C. 154(b) by 776 days.

(21) Appl. No.: 11/545,587

(22) Filed: Oct. 11, 2006

(51) Int. Cl.
*H04L 12/28* (2006.01)
(52) U.S. Cl. .................. 370/389; 370/236; 370/238
(58) Field of Classification Search ............... 370/389, 370/236, 238
See application file for complete search history.

(56) References Cited

U.S. PATENT DOCUMENTS

| | | | |
|---|---|---|---|
| 6,349,091 B1 * | 2/2002 | Li | 370/238 |
| 6,505,244 B1 * | 1/2003 | Natarajan et al. | 709/223 |
| 6,570,853 B1 * | 5/2003 | Johnson et al. | 370/236 |
| 7,299,038 B2 | 11/2007 | Kennedy et al. | |
| 7,412,241 B2 * | 8/2008 | Strutt | 455/445 |
| 2003/0058871 A1 | 3/2003 | Sastry et al. | |
| 2004/0047307 A1 | 3/2004 | Yoon et al. | |
| 2004/0174825 A1 | 9/2004 | Li et al. | |
| 2005/0152333 A1 | 7/2005 | Smith | |
| 2005/0276251 A1 | 12/2005 | Biddiscombe et al. | |
| 2005/0281204 A1 * | 12/2005 | Karol et al. | 370/248 |
| 2006/0010249 A1 | 1/2006 | Sabesan et al. | |
| 2006/0198346 A1 | 9/2006 | Liu et al. | |
| 2008/0062863 A1 * | 3/2008 | Ginde | 370/221 |
| 2008/0075175 A1 * | 3/2008 | Takahashi et al. | 375/240.28 |

OTHER PUBLICATIONS

John Centi, Wireless Mesh: The Evolution of the Wireless Network, Non Patent Literature Document, Dated Jan. 2004. Written by John Centi, 12 pages.
Jim Krane, Military Wireless Mesh Networks for Civilian Use, Article published in Dec. 2003 from Bradenton.com

* cited by examiner

*Primary Examiner*—Dang T Ton
*Assistant Examiner*—Pamit Kaur
(74) *Attorney, Agent, or Firm*—Edell, Shapiro & Finnan, LLC

(57) ABSTRACT

An efficient network formation technique for mobile ad-hoc wireless networks according to the present invention overcomes bandwidth overhead due to generation of database update or Link State Advertisement (LSA) messages in response to changes in certain parameters (e.g., node group size, etc.) with respect to both single and plural node group scenarios. The present invention controls flooding of LSA messages triggered by changes in these parameters (e.g., node group size), thereby reducing overhead traffic during network start-up. This is achieved without impact on message delivery capability and group merge operations. After network start-up is complete and the network is formed, the present invention continues to reduce LSA flooding in a mobile scenario when radios or nodes move into and out of range with one another.

33 Claims, 7 Drawing Sheets

METHOD AND SYSTEM FOR EFFICIENT NETWORK FORMATION AND MAINTENANCE OF NODE ROUTING DATABASES IN A MOBILE AD-HOC NETWORK

GOVERNMENT LICENSE RIGHTS

The U.S. Government may have a paid-up license in this invention and the right in limited circumstances to require the patent owner to license others on reasonable terms as provided for by the terms of contract DAAB07-03-9-K601.

BACKGROUND OF THE INVENTION

1. Technical Field

The present invention pertains to wireless communication systems. In particular, the present invention pertains to controlling transmission of network node routing and/or topology information throughout the network to reduce network overhead traffic.

2. Discussion of Related Art

In a mobile ad-hoc network (MANET), the locations and start-up sequence of radios or nodes are random. During the start-up phase, individual nodes communicate using network formation packets, adjacency or neighbor management packets and routing/topology information packets (Link State Advertisement (LSA)) to form and maintain a network. Since channel bandwidth is very limited in a wireless environment, overhead traffic loads used for forming a network must be maintained at minimum levels. However, these levels should not excessively penalize the performance of the network. Even in a stationary scenario, the network topology changes as more nodes are enabled and added to the network during network initialization. In a mobile scenario, the network topology similarly changes when nodes move within and out of range with each other.

In order to maintain a node routing and/or topology database current and synchronized with the entire network, LSA packets are triggered in response to important changes in network topology. The triggered LSA packets are flooded throughout the entire network. Since there are numerous changes during the initial network start-up, several new LSAs are generated. If a network is stable, certain entries within a node routing database are not likely to change much once these have been determined. However, other entries continue to change as node groups are being formed within the network (with each node group including a head node). The new LSAs triggered by changes in communication links are needed for radios or nodes to establish routes for message delivery. This information enables a radio or node to find shorter routes. Thus, the flooding of these LSAs is worthwhile since shorter routes improve the message delivery time and provide fewer transmissions and faster data channel availability. This flooding further reduces collisions and improves the message completion rate.

New LSAs triggered by changes in other parameters similarly add to the overhead traffic load. However, the benefits of flooding these LSAs are not as worthwhile. For example, flooding an LSA in response to a change in a node group size provides minimal benefits, especially for a network including a single node group since the node group is aware of the group size.

With respect to a network including plural node groups, the node group size is generally used in group merge operations. However, group member nodes do not have direct usage for this information in these types of operations, while the group head nodes already have current information on their own group size. Thus, the additional overhead traffic produced from LSAs triggered by changes in these types of parameters is significant and an extra burden on the network since the flooding is done by every radio or node in the group, and the load may grow rapidly in accordance with network conditions.

OBJECTS AND SUMMARY OF THE INVENTION

Accordingly, it is an object of the present invention to reduce overhead traffic associated with distribution of routing and/or topology information within a network.

It is another object of the present invention to selectively distribute routing and/or topology information within a network in response to certain conditions, thereby reducing overhead traffic associated with the information distribution.

Yet another object of the present invention is to control triggering of routing and/or topology messages within a network to control network overhead traffic.

The aforesaid objects may be achieved individually and/or in combination, and it is not intended that the present invention be construed as requiring two or more of the objects to be combined unless expressly required by the claims attached hereto.

According to the present invention, an efficient network formation technique for mobile ad-hoc wireless networks overcomes bandwidth overhead due to generation of database update or Link State Advertisement (LSA) messages in response to changes in certain parameters (e.g., node group size, etc.) with respect to both single and plural node group scenarios. The present invention controls flooding of LSA messages triggered by changes in these parameters (e.g., node group size), thereby reducing overhead traffic during network start-up. This is achieved without impact on message delivery capability and group merge operations. After network start-up is complete and the network is formed, the present invention continues to reduce LSA flooding in a mobile scenario when radios or nodes move into and out of range with one another.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

An exemplary network architecture that may be employed by the present invention is a multi-hop wireless ad-hoc network. This type of network does not include an infrastructure (e.g., there is no base station as in a cellular network, where a single-hop environment of a cellular network becomes a special case) and may be utilized in a hostile network environment (e.g., a tactical battlefield, etc.) with unfriendly jamming.

Figure 1A:
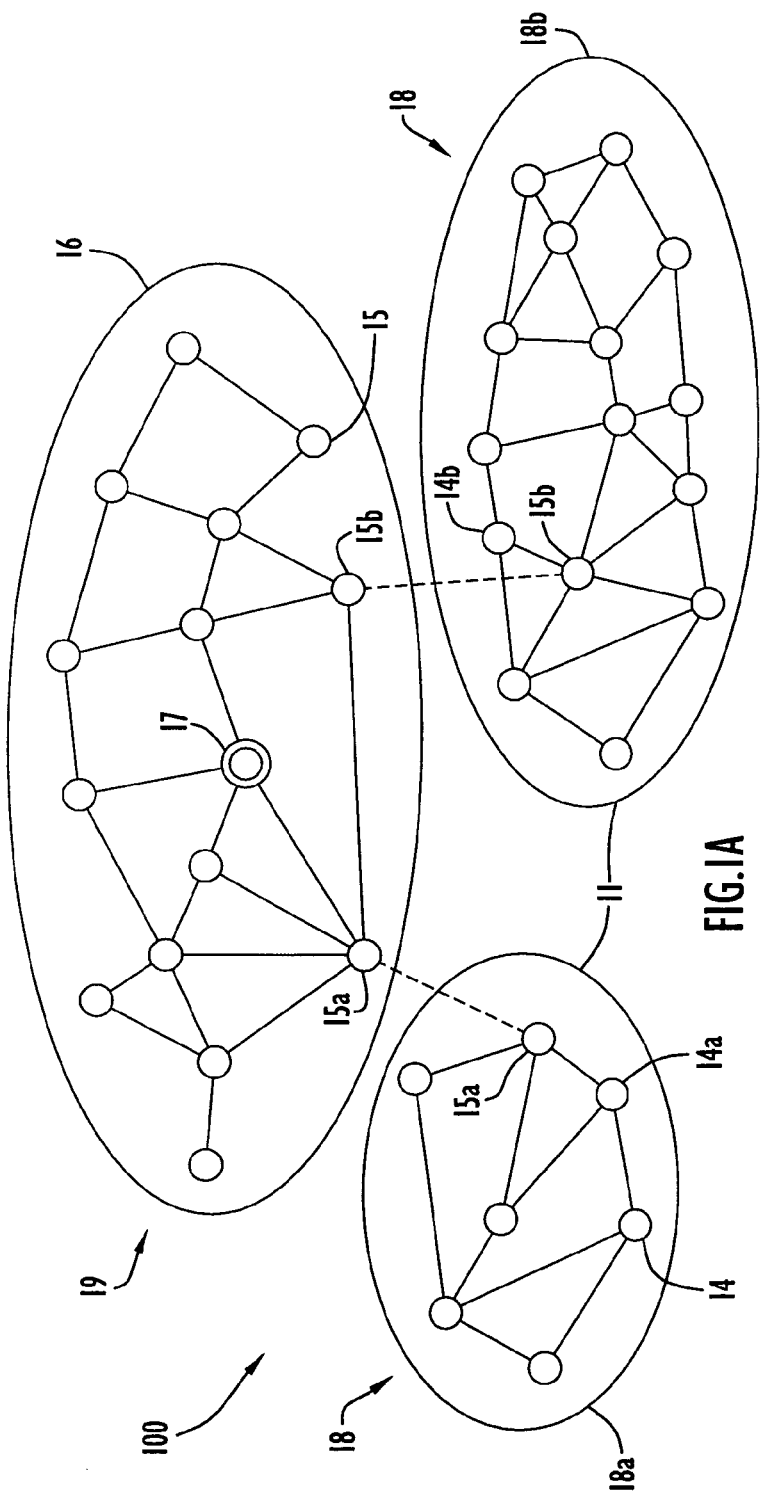
FIG. 1A is a diagrammatic illustration of network nodes according to the present invention arranged in an exemplary communication network.

An exemplary network that may be employed by the present invention is illustrated in FIG. 1A. Specifically, a wireless network 100 includes a plurality of islands 18, 19, where the network architecture is divided into two types of tiers. Each island 18 is in the form of a flat multi-hop network and includes corresponding island member nodes 14 with one of those member nodes designated as an island head node 15. This type of island arrangement forms a lower tier 11 of network 100 and facilitates communication within an island between the island head and member nodes and between the member nodes themselves. Island 19 includes head nodes 15 of each island that are in communication with each other and form a backbone network or an upper network tier 16. Island 19 similarly includes a head node 15 designated as an upper tier or island head node 17. In order to limit the size of an island, the maximum number of members in an island is controlled by the island head node. A solid line between two radios or nodes within FIG. 1A indicates that the two radios or nodes are in direct communication, while a dotted line between upper and lower tier nodes indicates that the two radios or nodes are physically interconnected within the same node (e.g., the node within upper tier 16 or island 19 also serves as a head node 15 within a lower tier 11 or corresponding island 18).

Nodes in the same tier can communicate with one another within an island (or group of nodes). However, member nodes within different islands typically utilize upper tier nodes or island heads to relay messages and communicate. The backbone network facilitates communications between nodes of different islands (e.g., generally providing communications over greater distances). For example, a node 14a from a first lower tier island 18a desires to transmit a message to node 14b of a second lower tier island 18b. Node 14a transmits the message to a corresponding head node 15a of the first island that utilizes upper tier 16 (or island 19) of network 100 to forward the message to a head node 15b of the second island. Head node 15b subsequently forwards the received message to destination node 14b. Alternatively, nodes 14 may be arranged to form a network including a single or any quantity of tiers.

Figure 1B:
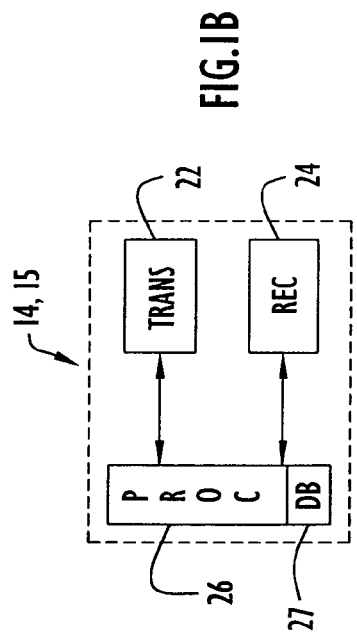
FIG. 1B is a block diagram of a network node of FIG. 1A.

A network node 14 according to the present invention is illustrated in FIG. 1B. Specifically, node 14 includes a transmitter 22, a receiver 24 and a processor 26. The processor is preferably implemented by a conventional microprocessor or controller and controls the node to transmit and receive messages for communications, and to perform the information exchange described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. The node further includes an identification (ID) (e.g., a code or identification number) to identify the particular node and a database 27 (e.g., within or coupled to processor 26) to store routing and/or topology information (e.g., generally pertaining to neighboring nodes). An island head node 15, 17 is substantially similar to node 14 described above. The network node may alternatively be configured for various types of networks.

The network preferably employs a link-state type of routing protocol. The database of each node 14, 15, 17 (e.g., island head and member nodes) maintains information enabling that node to determine appropriate paths for routing messages through the network. The information typically relates to links between the various network nodes. The node databases are synchronized in accordance with the routing protocol by transference of database update packets or messages (e.g., Link-State Advertisements (LSA)) between nodes that provide network connectivity and/or topology information. These packets are conventionally transmitted to each neighboring network node via broadcast or multiple unicast or point-to-point messages (e.g., messages from a source node to a specific destination network node), in response to changes in network topology or other modifications to the network facilitating changes in a node database. In addition, each node (e.g., island head and member nodes) periodically broadcasts a beacon type or neighbor discovery packet. This packet basically advertises the presence of a node within the network and is typically utilized by nodes for "keep alive" and neighbor discovery purposes.

Formation of the network is achieved through network initialization, island affiliation and LSA flooding. In particular, network initialization is started upon power-up with a node 14 taking actions to perform a role based on configured parameters. The node starts a Time-of-Day (TOD) synchronization process, such as the processes disclosed in U.S. Patent Application Publication No. 2004/00473307 (Yoon et al.) and U.S. patent application Ser. No. 10/690,552, entitled "Method and Apparatus for Automatic Control of Time-Of-Day Synchronization and Merging of Networks" and filed Oct. 23, 2003, the disclosures of which are incorporated herein by reference in their entireties. The synchronization process is completed when the node becomes either a head of an island or a member of an island as described below.

Once a radio or node has been initialized, the node commences island affiliation. This process is achieved through a neighbor discovery process. In particular, each radio or node maintains a neighbor table that may include neighboring nodes and their corresponding states (e.g., detected state, RF neighbor state and routing adjacency state). The detected state refers to a radio or node that has received messages from a neighboring node and starts exchanging organization packets (e.g., Packet Radio Organization Packet (PROP)) to establish communication link parameters. Successful establishment of a link enables the neighboring node to transition to the RF neighbor state. This state refers to the condition where organization packets have been successfully exchanged with the neighboring node and bi-directional communication may be performed. Once a neighboring node enters the RF neighbor state, the node may not transition back to the detected state, but may enter the routing adjacency state or be removed from the neighbor table in response to instructions from a node routing manager (e.g., a module, preferably functioning on or in combination with, node processor 26 to control node routing functions).

The routing adjacency state indicates that the node routing manager exchanges routing information with the neighboring node. A neighboring node may transition from the routing adjacency state back to the RF neighbor state in response to the node routing manager determining that the link has significantly degraded. A radio or node uses the routing adjacency neighboring nodes as intermediate nodes to route messages to other radios or nodes outside the boundaries for direct RF contact with that node.

Initially, all radios or nodes are unaffiliated at the beginning of network start-up. If no neighboring node is detected by a node after a predetermined amount of time, the node may become an island head node and wait for other nodes to join that initially forming island. Radios or nodes are generally pre-assigned to the upper and lower network tiers based on network configuration. When discovered nodes in RF neighbor states are all unaffiliated, one of the discovered nodes is elected as an island head node and the other nodes initiate a join request to that island head node. If one of the discovered nodes is already affiliated, this indicates the presence of an island head node. When a node fails to discover that island head node, the node uses one of the discovered nodes as a proxy to relay a join request to the island head node. When several affiliated radios or nodes are discovered, the node selects which island to join based on various factors (e.g., a node community of interest, etc.).

In order to limit the exchange of routing database information (e.g., transmission of Link State Advertisements (LSA)), the number of neighboring nodes in the routing adjacency state (e.g., referred to as the number of adjacencies) is limited by network configuration. When a radio or node has attained a maximum number of adjacencies, the node ceases to establish a new adjacency with other radios or nodes. Radios or nodes establish an adjacency only with RF neighbor nodes that are in the same island. RF neighbor nodes that are not in the same island as the radio or node are considered to be foreign neighbors, and LSAs received from those foreign neighbors are typically discarded (except during an island merge operation).

LSA flooding is used to distribute intranet routing information to members of an island. A radio or node originating an LSA sends the message to adjacency neighbors of the node. These nodes subsequently forward the message to their respective adjacency neighbors in response to the received LSA being new. LSAs are transmitted using a reliable protocol, and explicit or implicit acknowledgements are required from the adjacency neighbors. LSAs and corresponding acknowledgements are considered routing manger packets and are transmitted rapidly utilizing procedures that prevent an excess amount of overhead through the use of flood epoch timers and jitter timers. An unacknowledged LSA is retransmitted in response to expiration of an acknowledgement wait timer. This process is repeated until a new LSA (which replaces the prior LSA) is generated or the limit of flood retries is reached.

A new LSA is triggered by changes in the network topology database. This database typically includes information associated with an island ID, an island size, a node Medium Access Control (MAC) layer address, a radio type (e.g., one channel radio or two channel radio), a tier type (e.g., lower or upper tier), an island activity (e.g., island head or member node), and a list of neighbors (e.g., adjacent, non-adjacent intra-island, and/or inter-island). The LSA provides at least the above database information and is identified with a sequence number to enable recipients to distinguish new LSAs from previous ones.

Since there are numerous changes during the initial network start-up, several new LSAs are generated. For each radio or node, entries that typically change during network start-up include the island ID (e.g., originally defaults to zero, indicating unaffiliated), the island size (e.g., originally set to one for the node itself), the island activity (e.g., may become an island head or member node) and the list of neighbors (e.g., originally empty). During network formation, the radio or node joins an island and uses the MAC address of the island head as the island ID. As more radios join the island, the island size and the list of neighbors change. If a network is stable, the island ID and the island activity are not likely to change much once these have been determined. However, other entries (e.g., the island size and the list of neighbors) continue to change as the island is being formed.

The new LSAs triggered by changes in the list of neighbors are needed for radios or nodes to establish routes for message delivery. With more adjacencies, a radio or node is able to find shorter routes. Thus, the flooding of these LSAs, although adding more overhead traffic to the network, is a worthwhile trade-off for network performance since shorter routes improve the message delivery time, and fewer RF relays translate to fewer transmissions and faster availability of the data channel. This flooding further reduces collisions and improves the message completion rate.

The new LSAs triggered by changes in the island size similarly add to the overhead traffic load. However, the benefits in flooding these LSAs are not as worthwhile, especially for a network including a single island. With respect to a network including plural islands, the island size is used in the island merge operation. As the island merge operation is handled by the particular island head nodes involved, the island members themselves do not have direct usage for the island size information. Further, the island head nodes already have current information on their own island size since each member joins the island with the approval of the island head nodes.

Although the changes in the list of neighbors for a large sized island may be limited by the maximum adjacency and other maximum limits for respective neighbor types (which is usually smaller than the total island size), the changes in island size are unrestricted and continue until the island grows to the maximum size, or until the network is completely formed. Since the additional overhead traffic generated by island size changes is an extra burden on the network, the present invention controls the triggering and transmission of new LSA messages based on changes in island size, thereby reducing overhead traffic during network start-up. This extra overhead traffic may be significant since the LSA flooding is done by every radio or node in the island in response to a new member being added, and the load grows rapidly as the size of the island increases.

The present invention handles the island size change by recording the change (without triggering flooding of a new LSA) in response to the change being reported by radios or nodes in the local island. In the event the island size change is reported by radios or nodes from a foreign island, the island size change is recorded and flooding of a new LSA is further governed to reduce the impact as described below. The former case (e.g., the change is reported by a node within a local island) is applicable to both single and plural island scenarios, while the latter case (e.g., the change is reported by a node from a foreign island) is applicable to only plural island scenarios.

The changes to node database entries encountered during start-up are divided into two types including hard changes and soft changes. Hard changes include changes to entries relating to topology or routing (e.g., changes in the island ID, node MAC address, radio type, tier type, island activity, list of adjacent neighbors, list of non-adjacent intra-island neighbors and list of inter-island neighbors) that generally trigger an LSA flood. A soft change includes a change to an entry that may be redundant or unnecessary with respect to other information and/or that may be related to information that does not need to be immediately exchanged for routing or other functions (e.g., a change in island size as described above). Counts respectively associated with occurrences of soft and hard changes are recorded for each LSA entry in the node database (e.g., the counts may be stored in the database with the corresponding LSA entries) based on received reports, and are reset after preparations are performed for an LSA flood in response to proper conditions. The counts are utilized to determine appropriate conditions for flooding a triggered LSA in response to a soft change (e.g., change in island size, etc.) as described below.

Figure 2:
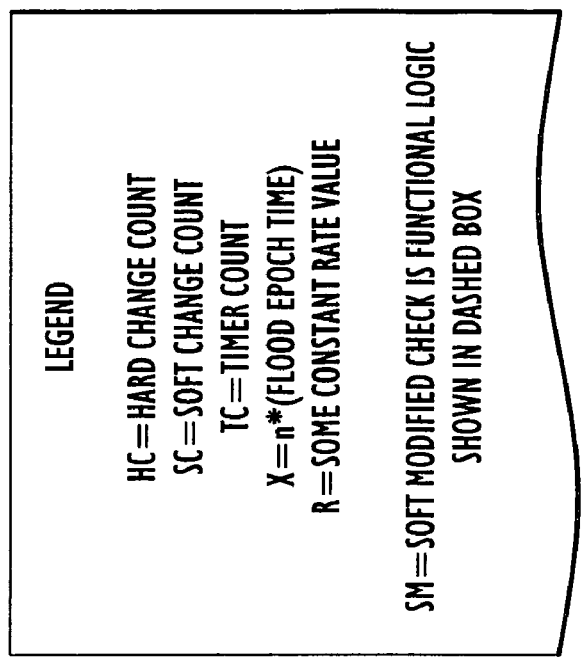
FIG. 2 is a flow diagram illustrating the manner in which a network parameter is processed by a receiving node according to the present invention.
Figure 2:
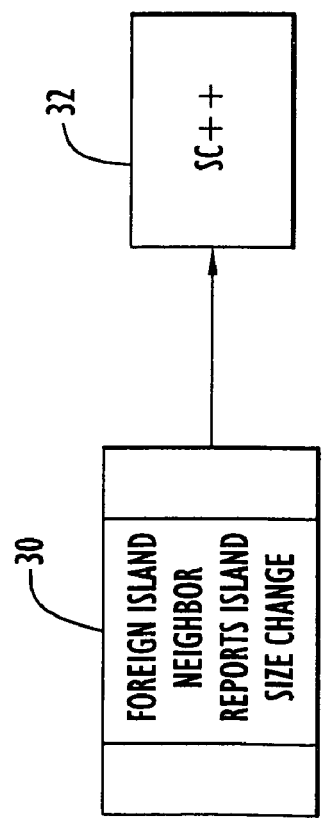

The manner in which a network node (e.g., via processor 26) processes an island size change received from a foreign island neighbor is illustrated in FIG. 2. Specifically, a network node receives an island size change from a neighboring node within a foreign island at step 30 and increments a soft change count (SC) at step 32. The received information and/or count may be stored with a corresponding LSA entry in the node database. Reports of hard changes trigger a flood of an LSA (in a manner similar to that described above) and an increment of a hard change count (HC). The soft and hard change counts in addition to a timer count (TC) are used to control flooding of an LSA as described below. An age timer is used in addition to a flood timer to provide a guaranteed time interval measurement for incrementing the timer count since the flood timer is adjusted by triggered LSAs of different priority and may not provide a guaranteed indication of elapsed time.

Figure 3:
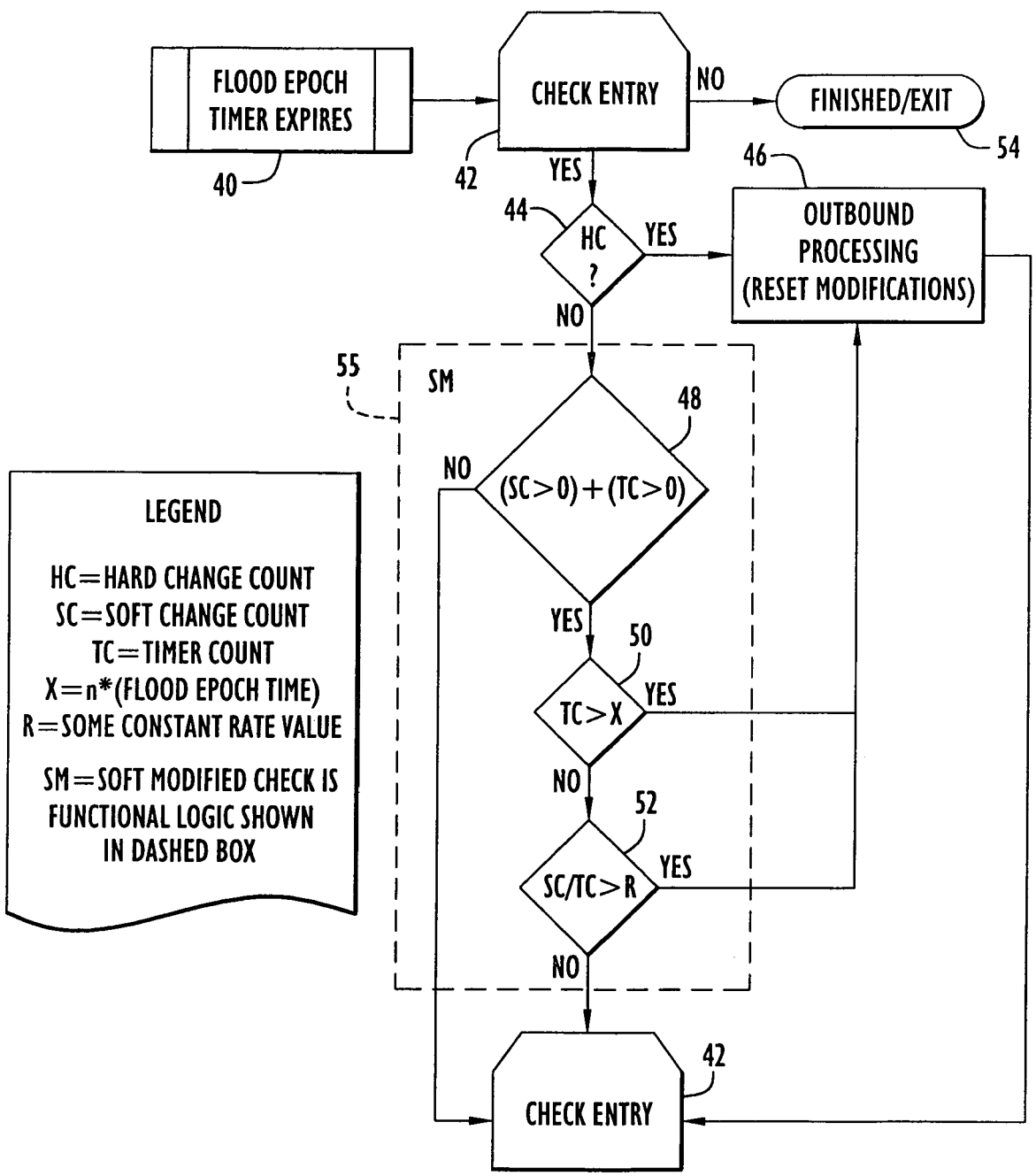
FIG. 3 is a procedural flow chart illustrating the manner in which database update messages are processed within flood intervals to determine the presence of appropriate conditions for transmission in accordance with the present invention.

The manner in which a node (e.g., via processor 26) processes LSA type entries in the node database in response to expiration of the flood timer to determine the presence of appropriate conditions for flooding an LSA is illustrated in FIG. 3. Initially, the flood timer ensures that LSAs are transmitted within a desired time interval. Specifically, when the flood timer expires as determined at step 40, the node attempts to retrieve an LSA entry from the node topology or routing database at step 42 (e.g., Check Entry as viewed in FIG. 3). If an entry cannot be obtained, the process terminates at step 54. However, if an entry is obtained, the hard, soft and timer counts (HC, SC and TC) are compared. In particular, when the retrieved entry includes any hard changes (e.g., hard count (HC) greater than zero) as determined at step 44, outbound processing is performed at step 46. This processing prepares for a flood of a new LSA and resets the hard, soft and timer counts (HC, SC and TC of the LSA entry being examined). Thus, detection of a hard change triggers an LSA flood as described above. The next LSA entry in the database is subsequently retrieved at step 42 (e.g., Check Entry as viewed in FIG. 3) to repeat the process.

When an entry lacks hard changes as determined at step 44, the node performs transmission control processing 55 (e.g., including steps 48, 50 and 52 as described below) to determine proper conditions for performing a flood of the LSA in response to a soft change. The transmission control processing considers factors that include the ability to account for the occurrence of soft changes and the time interval within which the soft changes have occurred. In a mobile ad-hoc network (MANET) application, the changing information is shared since this is a critical step in the convergence of LSA node databases. The factors described above are utilized to achieve an efficient quantity of transmissions while maintaining an adequate rate of information exchange among network nodes.

The first factor affecting the ability to exchange data is represented by the soft change count (SC) that maintains the number of soft change or event occurrences (e.g., island size changes, etc.). The quantity of these soft changes occurring in some fixed time interval provides a rate of change that may be compared against a rate threshold (e.g., R as viewed in FIG. 3). The ability to control and set different values of the rate threshold enables adjustment of the timeliness of reporting changes and reduction of the number of excess transmissions.

With respect to the factor relating to the time interval of the changes, the need to share the changed information is represented by the use of the timer count (TC) since a comparison of this value with a settable timer threshold (e.g., X as viewed in FIG. 3) acts as an upper bound on the maximum amount of elapsed time permitted before the changed data is exchanged. This provides a guarantee for the longest time interval allowed to transpire before the changed data is exchanged or distributed. This time interval controls the overall timeliness of database convergence.

In particular, the transmission control processing compares the soft change (SC) and timer (TC) counts to zero at step 48. If either the soft change count (SC) or timer count (TC) is zero (e.g., indicating the absence of soft changes or an insufficient time interval), the retrieved LSA entry is bypassed and the next LSA entry in the database is retrieved at step 42 (e.g., Check Entry as viewed in FIG. 3) to repeat the process.

If both of the soft change count (SC) and timer count (TC) are greater than zero as determined at step 48, the timer count (TC) is compared with a timer threshold (e.g., X as viewed in FIG. 3) at step 50. Since the timer threshold is set to a predetermined number of age timer expirations, this comparison determines the presence of a maximum time interval for flooding the LSA. In other words, the time count (TC) basically provides an indication of elapsed time to enable transmission of an LSA (or changed data) within a desired maximum time interval (e.g., a desired maximum amount of elapsed time permitted before changed data is exchanged). If the timer count (TC) exceeds the timer threshold (e.g., indicating that a maximum time interval has expired for flooding the LSA (or exchanging the changed data)), outbound processing is performed at step 46 as described above and the next LSA entry in the database is retrieved at step 42 (e.g., Check Entry as viewed in FIG. 3) to repeat the process.

When the timer count (TC) does not exceed the timer threshold, the rate of the soft change count (SC) (e.g., the quantity of soft change counts or occurrences within a time interval, or SC/TC) is compared with a rate threshold (e.g., R as viewed in FIG. 3). The rate threshold is set to a predetermined number of soft change counts (SC) for each timer count (TC). If the soft change count rate exceeds the rate threshold as determined at step 52 (e.g., indicating the presence of a sufficiently significant number of soft changes within a time interval to trigger an LSA flood), outbound processing is performed at step 46 as described above and the next LSA entry in the database is retrieved at step 42 (e.g., Check Entry as viewed in FIG. 3) to repeat the process.

When the soft change count rate does not exceed the threshold, the retrieved LSA entry is bypassed and the next LSA entry in the database is retrieved at step 42 (e.g., Check Entry as viewed in FIG. 3) to repeat the process. The above process is repeated until all the LSA entries within the node database are processed.

Figure 4:
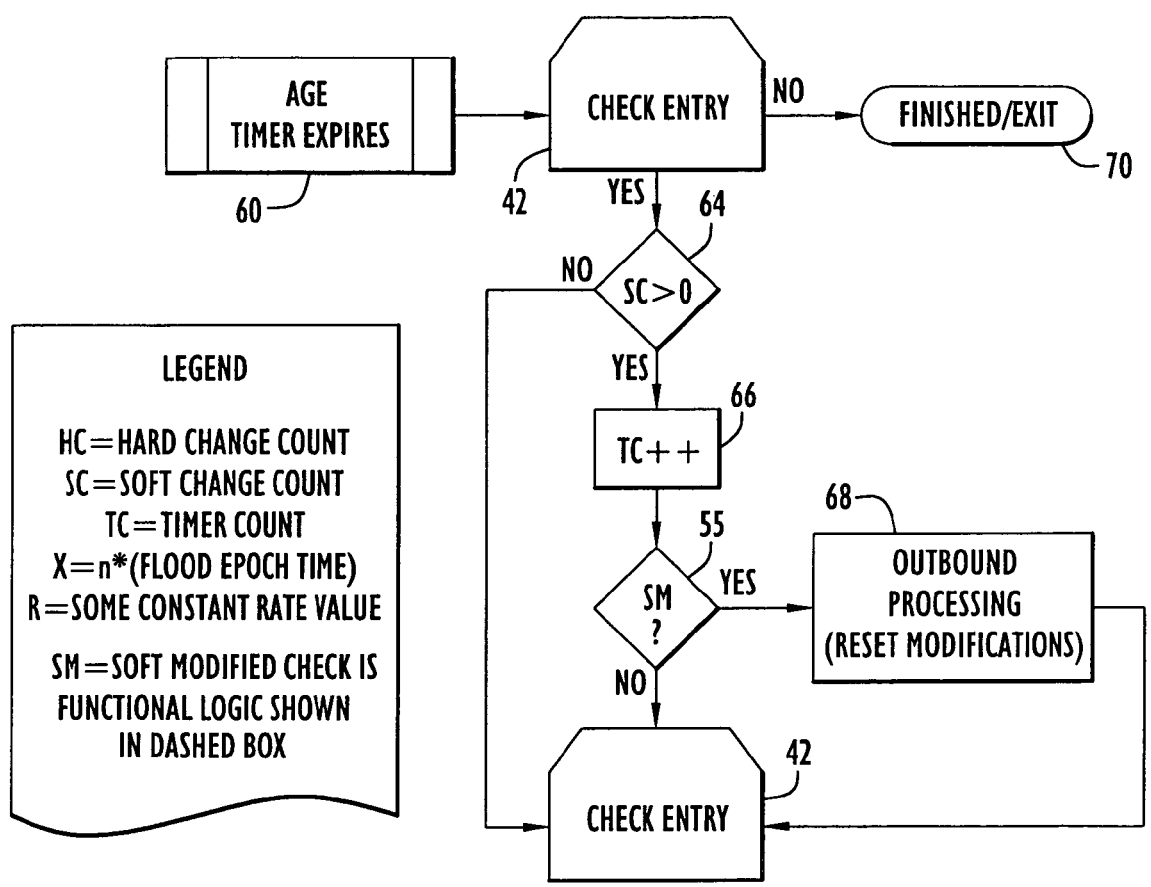
FIG. 4 is a procedural flow chart illustrating the manner in which database update messages are processed within predetermined time intervals to determine the presence of appropriate conditions for transmission in accordance with the present invention.

The manner in which a node (e.g., via processor 26) processes LSA entries in the node database in response to expiration of an age timer to determine the presence of appropriate conditions for flooding an LSA is illustrated in FIG. 4. Initially, the process is similar to the process described above for the flood timer, where the age timer provides an indication of elapsed time and ensures flooding of an LSA (or changed data) within a desired maximum time interval as described above. The LSA entries are retrieved from the database and the soft change count (SC) is examined to determine the presence of soft changes. If soft changes are present for an entry (e.g., the soft change count (SC) is greater than zero), the timer count (TC) is incremented and the transmission control processing described above (e.g., transmission control processing 55) is performed. When soft changes are not present for an entry, the entry is bypassed and the next LSA entry is retrieved from the database for processing. The process continues until each LSA entry in the topology database has been processed.

Specifically, when the age timer expires as determined at step 60, the node attempts to retrieve an LSA entry from the node topology database at step 42 (e.g., Check Entry as viewed in FIG. 4) in substantially the same manner described above. If an entry cannot be obtained, the process terminates at step 70. However, if an entry is obtained, the entry is examined for soft changes at step 64. When the retrieved entry includes any soft changes (e.g., soft change count (SC) greater than zero), the timer count (TC) is incremented at step 66. The timer count (TC) enables an LSA (or changed data) to be flooded within a desired maximum time interval as described above. Transmission control processing 55 is subsequently performed to determine the presence of appropriate conditions (e.g., comparisons with timer and rate thresholds) for flooding the LSA. Transmission control processing 55 is substantially similar to the transmission control processing described above for FIG. 3 (e.g., transmission control processing 55 including steps 48, 50 and 52 of FIG. 3). If appropriate conditions exist for flooding the LSA, outbound processing is performed at step 68. This processing is substantially similar to the outbound processing described above for FIG. 3 and prepares for a flood of a new LSA and resets the hard, soft and timer counts (HC, SC and TC of the LSA entry being examined). The next LSA entry in the database is subsequently retrieved at step 42 (e.g., Check Entry as viewed in FIG. 4) to repeat the process.

When transmission control processing 55 determines that proper conditions for flooding the LSA are not present, the retrieved LSA entry is bypassed and the next LSA entry in the database is retrieved at step 42 (e.g., Check Entry as viewed in FIG. 4) to repeat the process. The above process is repeated until all the LSA entries within the node database are processed.

The values provided for the timer (e.g., X) and rate (e.g., R) thresholds greatly affect the resource efficiency being sought and timely data exchange. These values basically enable a network designer to appropriately address the trade-off between resource efficiency and data exchange rate depending on a particular application. In this case, the soft change count (SC) is used to account for the reporting requirement for inter-island neighbors to report island size in topology type LSAs. For other LSA types or other specific data, the values of the timer and rate thresholds may be adjusted to achieve the desired balance. Each different LSA type may include a different set of values for the soft change count (SC), timer count (TC), timer threshold (e.g., X) and rate threshold (e.g., R) to enable reduction in network control overhead contributed by a particular LSA type and the corresponding data the message carries.

The values of the timer and rate thresholds may vary in accordance with the particular applications. Since the timer threshold imposes an upper bound on the maximum time changed data is retained, a study of changing threshold values in conjunction with the desired needs should be conducted. For example, if rates of change in a particular network are small and a guarantee of transmission at some point in time is desired, small values of the timer threshold should be utilized. However, this will trump noticeable differences in changing values of the rate threshold. In the plural island test case described below (FIG. 7), the impact of the timer threshold (e.g., X) is eliminated by setting that threshold to a very large value to prevent a trigger condition. In this case, only the rate threshold value (e.g., R) has an impact. This is a reasonable scenario since the impact on bandwidth utilization due to excess transmissions is being measured (and not the timeliness of database convergence).

Figure 5:
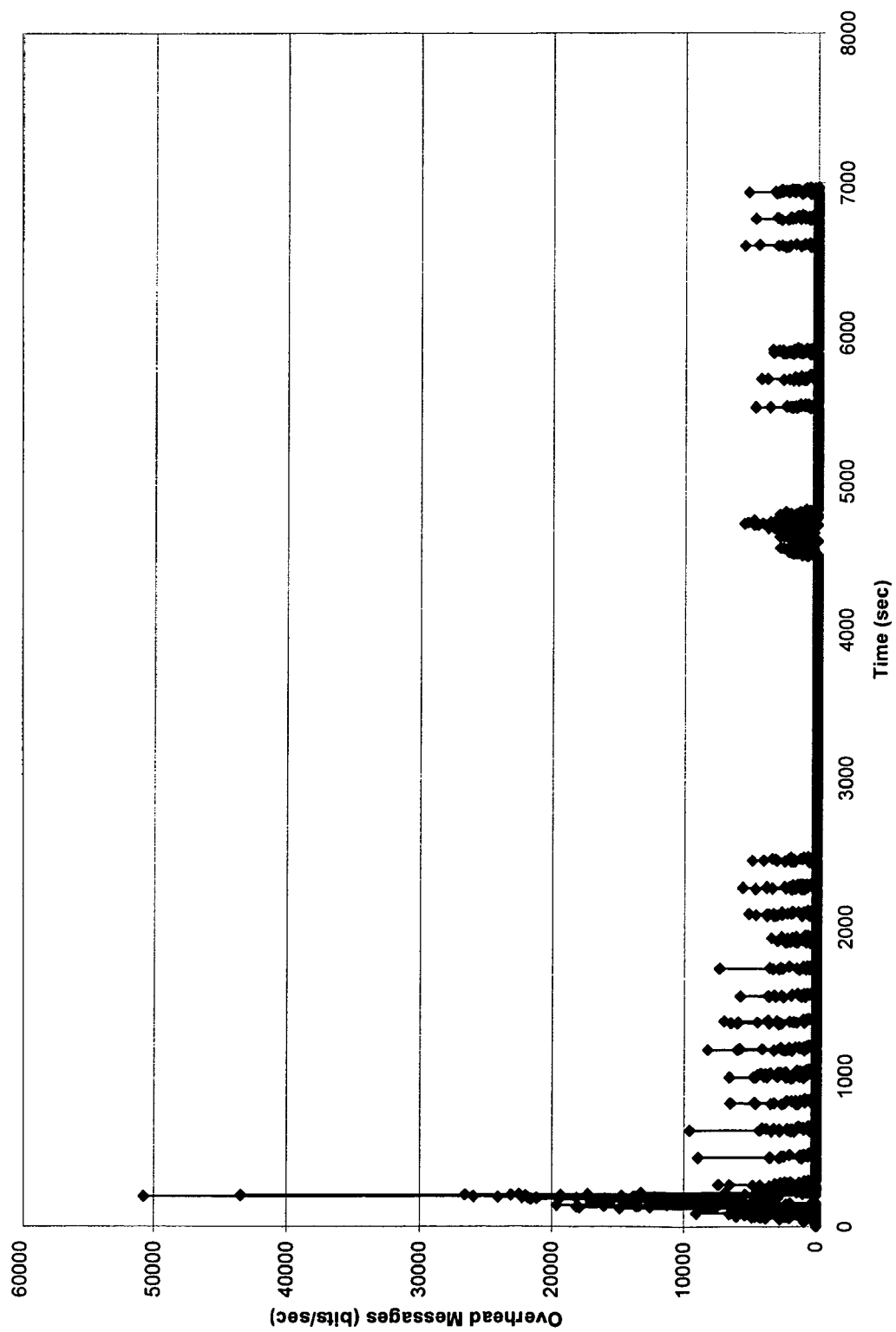
FIG. 5 is a graphical plot of overhead messages transmitted over time within a conventional communication network employed in a single island scenario.

The present invention was modeled and simulated with respect to a single island scenario including twenty radios or nodes in a lower network tier. The results indicated that during the network start-up phase, the peak LSA overhead traffic was reduced by a factor of approximately four without impacting the network performance. FIG. 5 illustrates the transmitted LSA flood overhead traffic over the whole network for a conventional communication network. The radios or nodes are randomly enabled during the first one-hundred seconds of the simulation. During the start-up phase, the island size is changing and the peak overhead messages reach over 50,000 bits per second (bps).

Figure 6:
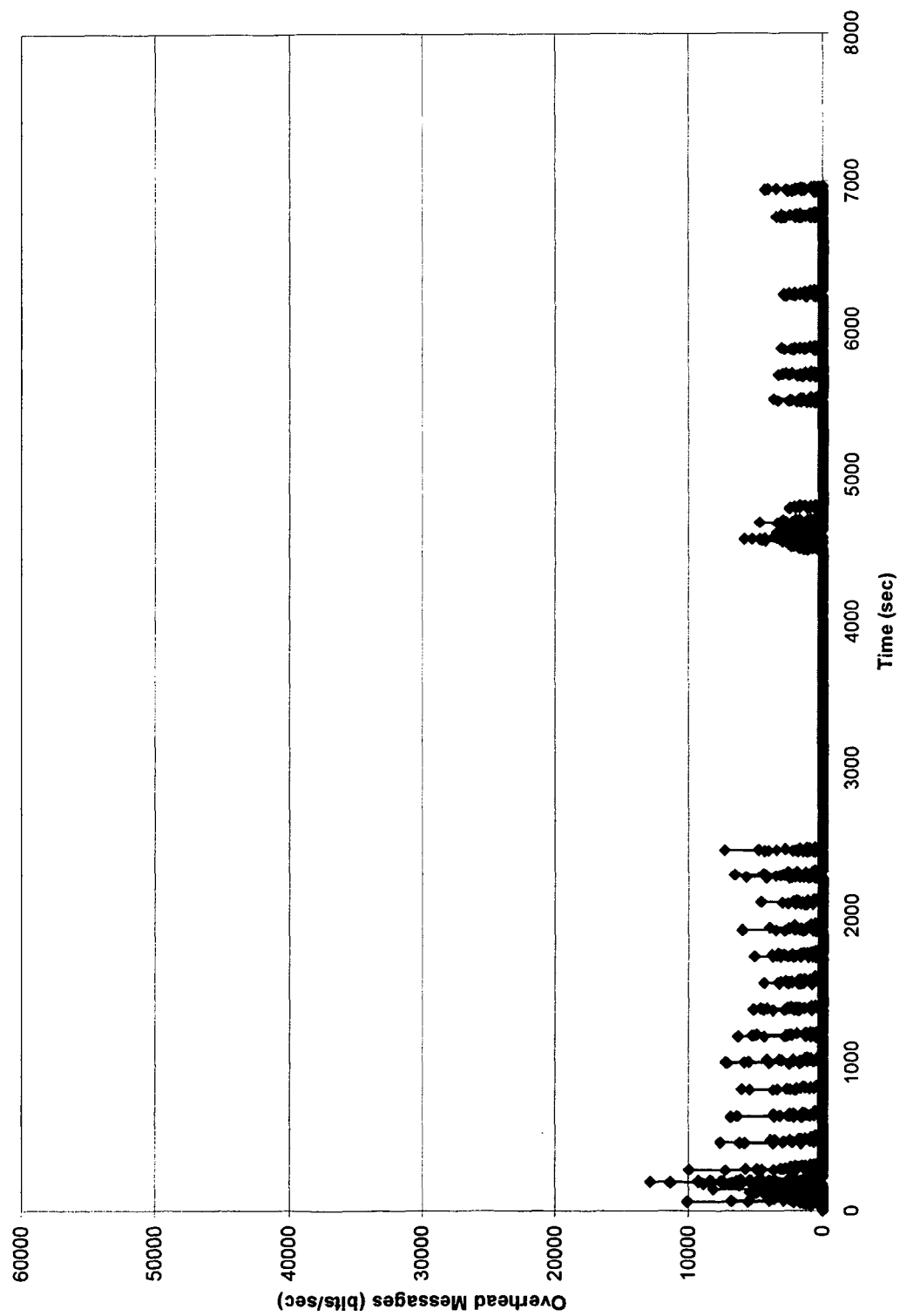
FIG. 6 is a graphical plot of overhead messages transmitted over time within a communication network according to the present invention employed in a single island scenario.

The results for the present invention under a similar scenario are illustrated in FIG. 6. In this case, the peak overhead messages are below 13,000 bits per second (bps) during the entire start-up phase, thereby reducing the overhead traffic by a factor of approximately four. The results ignore the reporting requirement of intra-island neighbors reporting the island size. The improvement shown between FIGS. 5 and 6 provides an estimate for timely convergence of database information and the resulting decrease in the number of transmissions.

Figure 7:
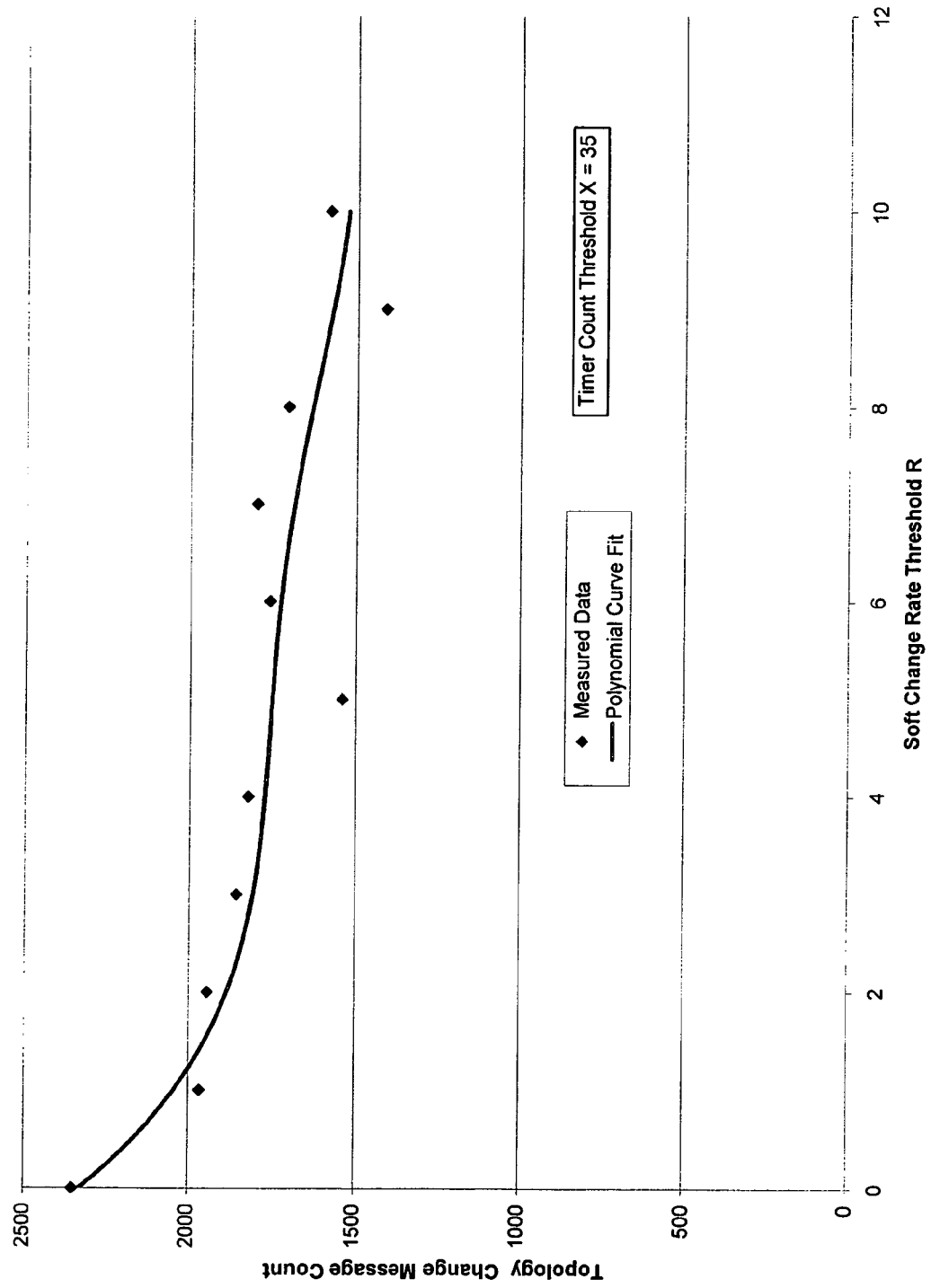
FIG. 7 is a graphical plot of overhead messages transmitted with respect to a rate of change threshold according to the present invention employed within a communication network.

A plural island test case is illustrated in FIG. 7. The network configuration includes four lower tier islands and one upper tier island. Each lower tier island includes six member nodes and an island head node. The head nodes of each lower tier island further reside in the upper tier island with one of those nodes being designated as a head node for the upper tier island. This scenario is more realistic since the inter-island neighbor island size reporting requirement cannot be suspended, and requires the careful setting of the timer and rate threshold values to determine the amount of improvement in resource utilization that may be achieved. The impact of the timer threshold (e.g., X) is eliminated by setting that threshold to a very large value (e.g., X=35) to prevent a trigger condition (e.g., prevent the upper bound test of timely transmission from interfering with improvements made by changing the rate threshold). In this case, only the rate threshold value (e.g., R) has an impact. This is reasonable since the impact on bandwidth utilization due to excess transmissions is being measured (and not the timeliness of database convergence).

FIG. 7 illustrates the topology change overhead traffic for several values of the rate threshold (e.g., R, where R=0 represents the conventional communication network and non-zero thresholds represent the present invention). As the rate threshold increases, the number of topology change messages decreases resulting in a reduction of the overhead by the present invention of approximately 34% for a large rate threshold.

It is to be understood that the present invention is not limited to the specific applications or networks described herein (e.g., tactical (ground-based) ad-hoc wireless networks, etc.), but may be applied to military or other ad-hoc wireless networks including or associated with airborne, ship-based and/or mixed ground-based/airborne/ship-based network configurations. Further, the present invention may be applied to commercial ad-hoc networks, such as WLAN (wireless LAN) networks (e.g., emerging 802.11 LANs and Bluetooth networks for industrial, medical, mining, firefighting and residential applications, etc.).

It will be appreciated that the embodiments described above and illustrated in the drawings represent only a few of the many ways of implementing a method and system for efficient network formation and maintenance of node routing databases in a mobile ad-hoc network.

The communication networks employing the present invention nodes may include any quantity of those nodes or tiers. The network nodes may be arranged in any fashion into any quantity of islands each having any quantity of nodes. The backbone network may include any quantity of head nodes, while communications within an island and between neighboring head nodes of the backbone network may utilize the same or different transmission frequencies. The formation of islands and designation of head nodes may be predetermined or accomplished dynamically via any conventional or other algorithm or technique. The nodes may communicate via any suitable communications medium (e.g., wired or wireless communication devices, etc.).

The present invention node may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The present invention node may include any quantity of independent transmitting and/or receiving devices, and utilize any quantity of frequency channels of any desired frequencies to send voice and/or data. The present invention node may employ any conventional access scheme or protocol to access and/or transmit information on data and/or voice channels. The present invention node may include any quantity of any conventional or other audio components (e.g., speaker, microphone, etc.) and associated circuitry or devices (e.g., coder, A/D or D/A converter, etc.) to process voice signals. The present invention node may further include any quantity of any types of input or control devices (e.g., buttons, switches, etc.) to enter voice or data and control node operation. The node may be in the form of any type of radio unit or other communications device.

The processor of the present invention node may be implemented by any conventional or other microprocessor, controller or circuitry to perform the functions described herein, while any quantity of processors or processing devices or circuitry may be employed within the present invention node. The processor functions may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings.

Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate control of LSA floods within the network in the manner described above.

The counters and timers (e.g., hard change count, soft change count, timer count, age timer, flood timer, etc.) may be implemented by any quantity of any combination of hardware and/or software units or modules. These devices may be within or coupled to the node processor. The timers may monitor any desired time interval, while the counters may adjust and maintain counts in any desired fashion (e.g., increment by any value, decrement by any value, start at any initial values, etc.). The age and flood timer intervals may be set to any desired values to accommodate particular applications.

The present invention may be applied to control flooding or other transmissions (e.g., broadcast, unicast, point-to-point, etc.) of any desired information (e.g., LSAs, neighbor discovery messages, keep alive messages, etc.). The present invention may delay transmission of the messages until any desired conditions are present (e.g., time intervals, presence of certain network conditions, etc.). The timer and rate thresholds may be of any quantity and may be set to any desired values to accommodate particular applications. The various counts may be compared to the corresponding thresholds in any desired fashion (e.g., greater than, less than, less than or equal to, greater than or equal to, equal to, not equal to, compared to threshold values within a range, etc.). The counts may be individually or collectively combined in any fashion (e.g., weighted, averaged, etc.). For example, a soft change count from plural time intervals may be averaged for comparison to the timer threshold.

The values of the timer and rate thresholds may be adjusted to achieve the desired balance for various types of LSAs or other messages, where each different type of LSA or other message may include a different set of values for the soft change count, timer count, timer threshold and rate threshold.

The packets or messages transmitted by the network (e.g., PROP, database update, organizational, LSA, neighbor discovery, etc.) may be of any size, may have any format and may contain any desired information. The packets may be transmitted at any suitable transmission rate or have any desired interval between transmissions. The various messages or packets may include any identifier to identify the type of message or packet. The packets may be broadcasted or transmitted any quantity of times.

The node database may be implemented by any conventional database or other storage structure (e.g., processor memory, external memory, file, data structure (e.g., array, queue, stack, etc.), etc.) and may have any desired storage capacity to contain any desired information arranged in any fashion.

It is to be understood that the present invention is not limited to the applications or networks described herein, but may be utilized for various communication applications or networks, especially those including wireless ad-hoc radio networks.

From the foregoing description, it will be appreciated that the invention makes available a novel method and system for efficient network formation and maintenance of node routing databases in a mobile ad-hoc network, wherein transmission of network node routing information throughout the network is controlled to reduce network overhead traffic.

Having described preferred embodiments of a new and improved method and system for efficient network formation and maintenance of node routing databases in a mobile ad-hoc network, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication unit to transmit and receive information within a communications network and to control transference of said information to reduce network overhead traffic comprising:

a transmitter to transmit outgoing information to at least one other communication unit within said network;

a receiver to receive incoming information from at least one other communication unit within said network;

a storage unit to store routing information; and a processor to control said transmission and reception of said outgoing and incoming information, wherein said processor includes:

a traffic control module to facilitate transmission of a network message based on occurrence of a first type of network condition indicating a change in at least one of routing and topology within said communications network and to selectively facilitate transmission of said network message in response to occurrence of a second type of network condition, wherein said network message includes an update message to synchronize said routing information within storage units of said communication units of said communications network, wherein transmission of said network message to synchronize said routing information is performed upon occurrence of said first type of network condition, wherein transmission of said network message to synchronize said routing information in response to occurrence of said second type of network condition is performed upon the earlier of expiration of a maximum allowable time interval for transmission of said network message and a rate of occurrence of said second type of network condition attaining a desired level, and wherein said traffic control module includes:

a rate compare module to compare a quantity of occurrences of said second type of network condition within a predetermined time interval to a rate threshold value to determine attainment of said desired level by said rate of occurrence.

2. The unit of claim 1, wherein said communications network includes an ad-hoc wireless network.

3. The unit of claim 1 further including:

a transmission timer to measure a predetermined time interval for transmissions; and an interval timer to measure elapsed time;

wherein said processor further includes:

a recordation module to maintain a quantity of occurrences of said first and second types of network conditions and a quantity of expirations of said interval timer, wherein entries stored in said storage unit are associated with update messages received from other communication units and corresponding quantities of occurrence of said first and second types of network conditions; and a retrieval module to retrieve entries from said storage unit associated with said received update messages.

4. The unit of claim 3, wherein said update message includes a Link State Advertisement.

5. The unit of claim 1, wherein said communications network includes at least one group each including at least one said communication unit, and wherein said second type of network condition includes a change in a size of a group.

6. The unit of claim 3, wherein said traffic control module includes:

a transmission module to examine each retrieved entry and to facilitate transmission of a corresponding update message in accordance with said quantity of occurrences of said first type of network condition associated with that entry indicating an occurrence of said first type of network condition.

7. The unit of claim 6, wherein said traffic control module further includes:

a delay transmission module to examine each retrieved entry and to selectively facilitate transmission of a corresponding update message in response to one of said expiration of said maximum allowable time interval and said rate of occurrence of said second type of network condition attaining said desired level.

8. The unit of claim 7, wherein said delay transmission module further includes:

a time compare module to compare said quantity of timer expirations to a timer threshold value to determine said expiration of said maximum allowable time interval.

9. The unit of claim 8, wherein said delay transmission module further includes said rate compare module, and wherein said rate compare module is configured to perform said determination of attainment of said desired level in response to determining that said maximum allowable time interval has not expired.

10. The unit of claim 3, wherein said processor further includes:

a reset module to reset said quantity of occurrences of said first and second types of network conditions and said quantity of interval timer expirations in response to transmission of said network message.

11. The unit of claim 1, wherein said incoming and outgoing information is in the form of Radio Frequency (RF) signals.

12. A method of controlling transference of information between a communication unit and other units within a communications network to reduce network traffic comprising:

(a) transmitting a network message from a communication unit upon occurrence of a first type of network condition indicating a change in at least one of routing and topology within said communications network, wherein said network message includes an update message to synchronize routing information within storage units of said communication units of said communications network; and (b) selectively transmitting said network message from said communication unit in response to occurrence of a second type of network condition, wherein transmission of said network message to synchronize said routing information in response to occurrence of said second type of network condition is performed upon the earlier of expiration of a maximum allowable time interval for transmission of said network message and a rate of occurrence of said second type of network condition attaining a desired level, and wherein a quantity of occurrences of said second type of network condition within a predetermined time interval is compared to a rate threshold value to determine attainment of said desired level by said rate of occurrence.

13. The method of claim 12, wherein said communications network includes an ad-hoc wireless network.

14. The method of claim 12, wherein said communication unit includes:

a transmission timer to measure a predetermined time interval for transmissions; and an interval timer to measure elapsed time;

wherein step (a) further includes:

(a.1) maintaining a quantity of occurrences of said first and second types of network conditions and a quantity of expirations of said interval timer, wherein entries stored in said storage unit are associated with update messages received from other communication units and corresponding quantities of occurrence of said first and second types of network conditions; and (a.2) selectively retrieving entries from said storage unit associated with said received update messages.

15. The method of claim 14, wherein said update message includes a Link State Advertisement.

16. The method of claim 12, wherein said communications network includes at least one group each including at least one said communication unit, and wherein said second type of network condition includes a change in a size of a group.

17. The method of claim 14, wherein step (a) further includes:

(a.3) examining each retrieved entry and transmitting a corresponding update message in accordance with said quantity of occurrences of said first type of network condition associated with that entry indicating an occurrence of said first type of network condition.

18. The method of claim 17, wherein step (b) further includes:

(b.1) examining each retrieved entry and selectively transmitting a corresponding update message in response to one of said expiration of said maximum allowable time interval and said rate of occurrence of said second type of network condition attaining said desired level.

19. The method of claim 18, wherein step (b) further includes:

(b.1.1) comparing said quantity of timer expirations to a timer threshold value to determine said expiration of said maximum allowable time interval.

20. The method of claim 19, wherein step (b) further includes:

(b.1.2) determining attainment of said desired level in response to determining that said maximum allowable time interval has not expired.

21. The method of claim 14 further including:

(c) resetting said quantity of occurrences of said first and second types of network conditions and said quantity of interval timer expirations in response to transmission of said network message.

22. The method of claim 12, wherein said information transferred between said communication units is in the form of Radio Frequency (RF) signals.

23. A communications network comprising:

a plurality of communication units for transferring information therebetween, wherein each communication unit includes a storage unit to store routing information, wherein network messages are transmitted based on occurrence of a first type of network condition indicating a change in at least one of routing and topology within said communications network and selectively transmitted in response to occurrence of a second type of network condition, wherein said network message includes an update message to synchronize said routing information within storage units of said communication units of said communications network, wherein transmission of said network message to synchronize said routing information is performed upon occurrence of said first type of network condition, wherein transmission of said network messages to synchronize said routing information in response to occurrence of said second type of network condition is performed upon the earlier of expiration of a maximum allowable time interval for transmission of said network messages and a rate of occurrence of said second type of network condition attaining a desired level, and wherein said communication units compare a quantity of occurrences of said second type of network condition within a predetermined time interval to a rate threshold value to determine attainment of said desired level by said rate of occurrence.

24. The network of claim 23, wherein said communications network includes an ad-hoc wireless network.

25. The network of claim 23, wherein each communication unit further includes:

a transmission timer to measure a predetermined time interval for transmissions; and an interval timer to measure elapsed time;

wherein said communication units maintain a quantity of occurrences of said first and second types of network conditions and a quantity of expirations of said interval timer, and entries stored in said storage unit are associated with update messages received from other communication units and corresponding quantities of occurrence of said first and second types of network conditions.

26. The network of claim 25, wherein said update message includes a Link State Advertisement.

27. The network of claim 23, wherein said communications network includes at least one group each including at least one said communication unit, and wherein said second type of network condition includes a change in a size of a group.

28. The network of claim 25, wherein said communication units examine each entry associated with a received update message within a corresponding storage unit and transmit a corresponding update message in accordance with said quantity of occurrences of said first type of network condition associated with that entry indicating an occurrence of said first type of network condition.

29. The network of claim 25, wherein said communication units examine each entry associated with a received update message within a corresponding storage unit and selectively transmit a corresponding update message in response to one of said expiration of said maximum allowable time interval and said rate of occurrence of said second type of network condition attaining said desired level.

30. The network of claim 29, wherein said communication units compare said quantity of timer expirations to a timer threshold value to determine said expiration of said maximum allowable time interval.

31. The network of claim 30, wherein said communication units determine attainment of said desired level in response to determining that said maximum allowable time interval has not expired.

32. The network of claim 25, wherein said communication units reset said quantity of occurrences of said first and second types of network conditions and said quantity of interval timer expirations in response to transmission of said network message.

33. The network of claim 23, wherein said transferred information is in the form of Radio Frequency (RF) signals.

* * * * *